INVENTOR:
NORMAN F. BROWN
BY
Mellin and Hanscom
ATTORNEYS

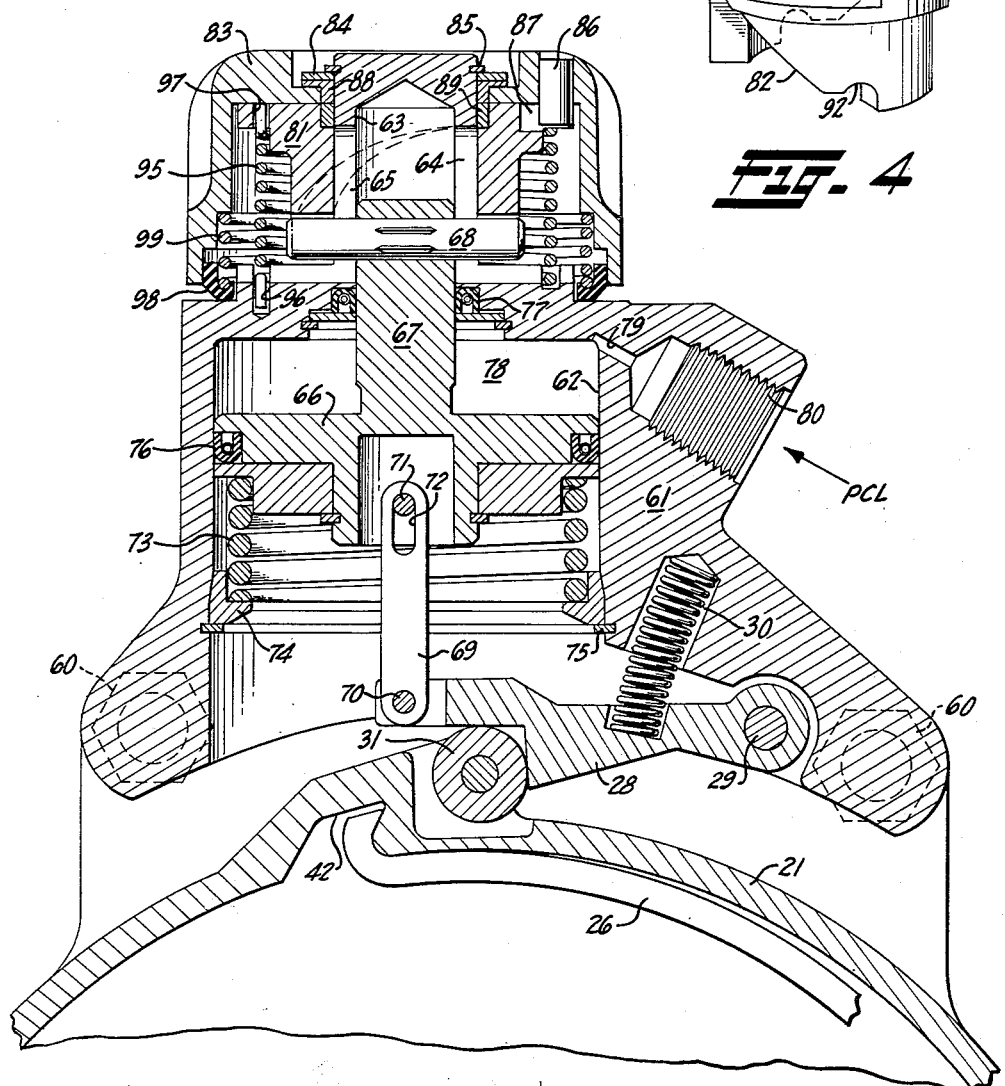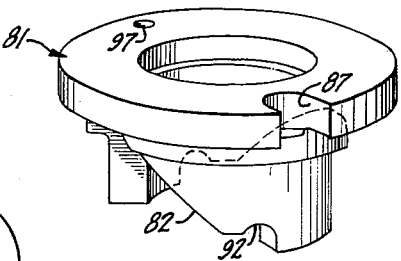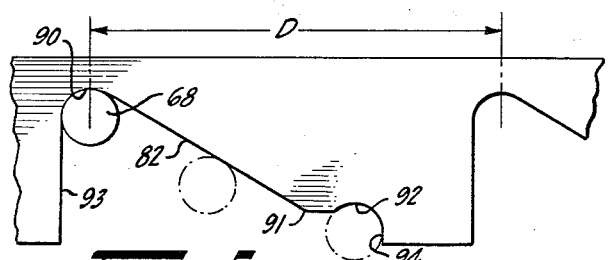

United States Patent Office 3,122,351
Patented Feb. 25, 1964

3,122,351
SPRING DRIVEN ACTUATING MECHANISM FOR LOW TORQUE VALVES
Norman F. Brown, Dallas, Tex., assignor to Otis Engineering Corporation, Dallas, Tex., a corporation of Delaware
Filed July 31, 1962, Ser. No. 213,689
13 Claims. (Cl. 251—73)

This invention relates to a pressure-responsive actuating mechanism and more particularly to a valve operating mechanism that is spring powered and may be attached to a conventional plug valve, thereby providing what is known as a safety valve which is used in the oil well industry to protect well production apparatus.

Safety valves are commonly used in well safety control systems in which an instrument airline network is normally maintained at low pressure by air or gas from a bottle or other source. Various sensing devices are then connected between the instrument air network and the various portions of the well production apparatus to be protected. When any portion of the production apparatus gets out of its predetermined safe pressure range, the sensing device associated with that apparatus automatically vents or exhausts the instrument air network causing any safety valves controlled by it to be closed, thereby providing the necessary safety and protection for the equipment.

Although some safety valves are required to open in an emergency, other are required to close. The present invention is embodied in an actuating mechanism that may be attached to a conventional plug valve for either opening or closing said valve in an emergency. The actuating mechanism provided requires that the valve must be manually reset for either type of operation to which it may be adapted. In this disclosure of the invention, the valve actuating mechanisms described are adapted for closing their associated valves under abnormal pressure conditions. However, it should be understood that the actuating mechanisms could be used for opening the valves as well.

Safety valves controlled by pressure-sensitive pilots responsive to adversely high or low pressures are quite common in the oil well industry, but many of these devices have several shortcomings. For example, the more commonly known safety valves are quite costly and their structures have been such that accumulations of paraffin, sand or debris have jammed the mechanisms, rendering them inoperable.

One particular object of this invention is to provide a safety valve including an actuating mechanism for use with a basic plug type valve having a pivoted valve element. Such a safety valve may be more economically manufactured than other types of safety valves and is less likely to be jammed by debris or the like because of its rotary valving movement.

Another object of this invention is to provide a spring-powered pressure-responsive mechanism for attachment to a well-known plug valve.

Another important object of the invention is to provide a safety valve which is easy and simple to operate and to reset.

Also, an object of this invention is to provide a safety valve which can be reopened and returned to service although the pressure within the valve is still out of range. Once the valve has been reset it requires no further attention, since the triggering mechanism for closing the valve (or opening the valve) will be automatically reset when the pressure within the control mechanism comes into a predetermined normal range of pressures.

A still further object is to provide a unitized pressure-responsive actuating mechanism which can be attached to an existing manually controlled plug valve without any modification.

Another object is to provide a pressure-responsive actuating mechanism which in operation does not depend upon an elimination or the bleeding of fluids, and is therefore more suitable for operation in adverse climatic conditions than mechanisms which are so dependent.

Another object of this invention is to provide a safety valve actuated by mechanism including a pressure-responsive device which can be readily tested at any time to ensure that it will function properly if and when abnormal pressure conditions exist.

Another object is to provide a combination of a valve having a rotatably operated valve element, means for rotatably biasing said valve element, means for latching said valve element in opposition to said biasing means, and means responsive to an abnormal pressure for releasing said latching means and allowing said valve element to be operated by the rotatable biasing means.

Another object of the invention is to provide a condition-responsive actuating mechanism for devices having a pivoted member and comprising means including a support for mounting said mechanism to said device, a spring-operated drum housing secured to said pivoted member, a clock spring coiled within said drum and having ends connected between said mounting means and said drum housing, means mounted to said mounting means for latching said drum housing against the bias of said clock spring, and means responsive to an abnormal fluid pressure for releasing said latching means.

A further object of the invention is to provide a pressure-responsive latching mechanism comprising a latching means including a latch finger adapted to be moved between latching and unlatching positions, means biasing said latch finger toward a latching position, means including a piston responsive to fluid pressure for moving said latch finger against said biasing means toward an unlatching position, a lost motion linkage connection intermediate said piston and said latch finger, said linkage connection allowing relative movement between said piston and latch finger for a range of normal pressures within said fluid pressure means but moving said latching means when pressures are abnormal.

Other objects of this invention will become apparent in view of the following detailed description and the accompanying drawings.

In the drawings forming a part of this application and in which like parts are identified by like reference numerals throughout the same, FIG. 1 is a section of a conventional plug valve having one embodiment of an actuating mechanism such as contemplated by this teaching connected thereto, said actuating mechanism being shown partly in longitudinal section;

FIG. 3 is an enlarged section of a portion of the actuating mechanism taken on lines 3—3 of FIG. 1;

FIG. 4 is a perspective view of a helical cam member which is utilized with the actuating mechanism; and FIG. 5 is a profile development of one-half the circumference of the cam member shown in FIG. 4.

Figure 1:
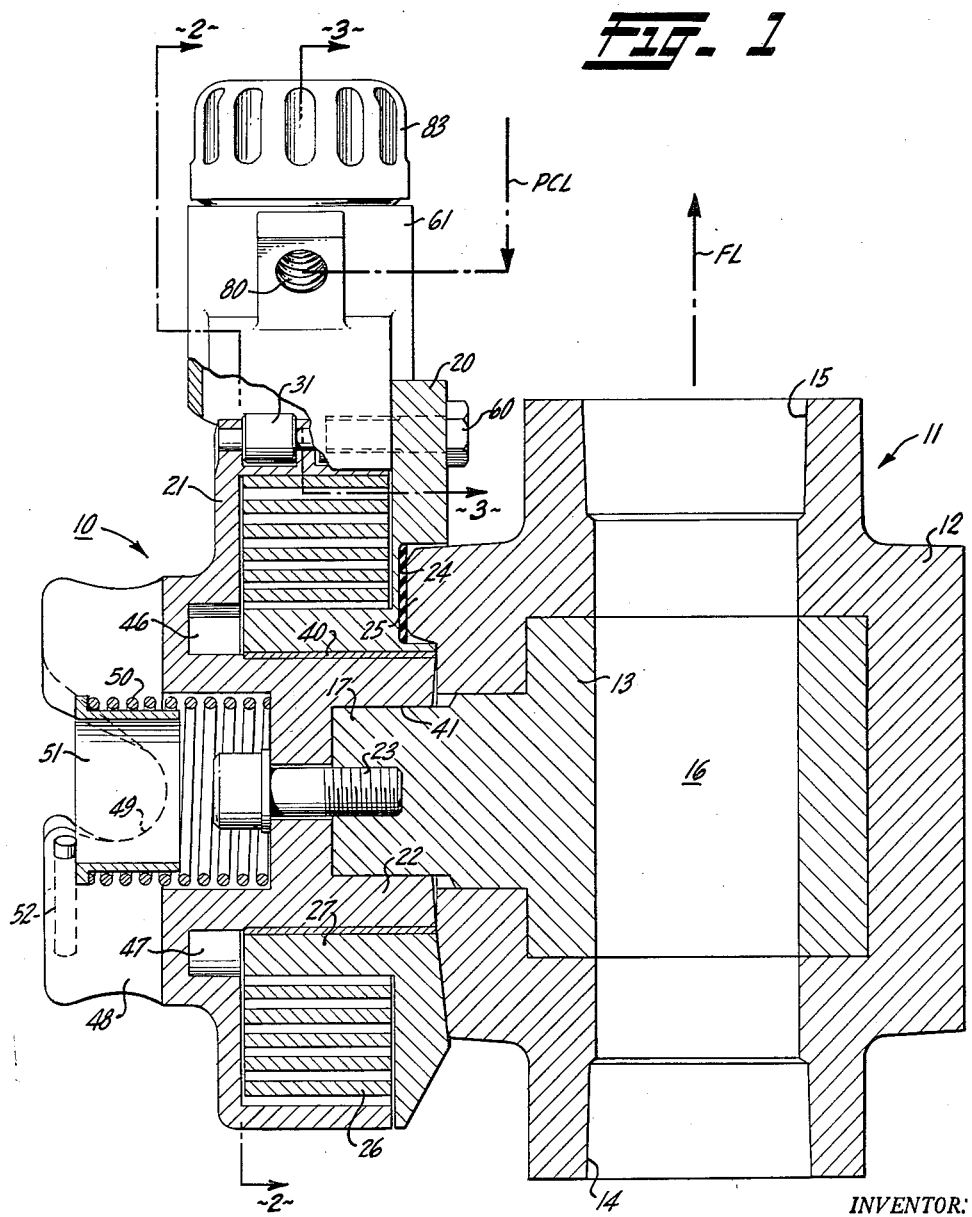

Referring to the drawings, there is shown a preferred embodiment of this invention in a pressure-responsive actuating mechanism 10 for a plug type valve 11 which is of conventional design and having a rotatable or pivotally mounted valve element. For the purpose of this disclosure, valve 11 may be like that of the Halliburton low-torque plug valve illustrated and described on page 2308 of the Composite Catalog of Oil Field Equipment and Services, 1960–61 Edition.

Valve 11, like other plug valves, is comprised of a body 12 with a plug or valve element 13 rotatably disposed therein as shown. Body 12 is provided with inlet and outlet flow passages 14 and 15 respectively, and the plug 13 is formed with a passage 16 which can be either aligned or misaligned with passages 14 and 15 by rotating the plug as desired. Plug 13 is rotated by applying a torque through the mechanism 10 to the plug stem 17 which extends or protrudes from the body 12.

Ordinarily, a plug valve is both manually opened and manually closed. The actuating mechanism 10, however, provides means whereby the valve 11 is to be opened manually but is closed automatically in response to the pressure in a control line PCL.

In general, the mechanism 10 includes a mounting plate 20 which is non-rotatable relative to the valve body 12. A spring operated drum housing 21 having an internal sleeve portion 22 is rigidly secured to the end of the valve stem 17 by means of a screw 23.

It will be noted that the base plate 20 may be suitably recessed as at point 24 for receiving the conventional locating projection 25 of the valve 11. With such an arrangement, bolt 23 need be the only means for attaching the mechanism 10 to the valve.

A coiled clock spring 26 is disposed within the housing 21. The outermost coil of the spring 26 is secured to the drum 21 and the inner coil of the spring is connected to a cylindrical hub sleeve portion 27 which forms a part of the mounting plate 20 and projects coaxially of the valve element pivot axis.

Figure 2:
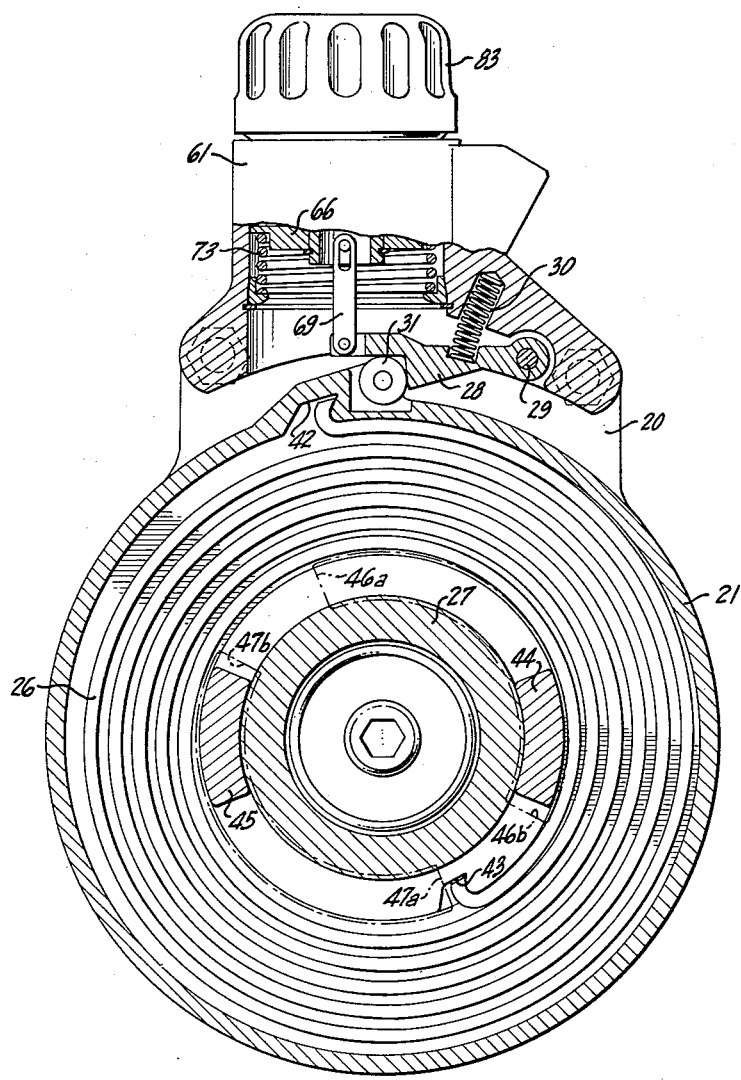
FIG. 2 is a section taken on the broken lines 2—2 of FIG. 1.

The valve is opened by rotating the drum 21 in a counterclockwise direction relative to the illustration of FIG. 2 until the passageway 16 of the valve element 13 is aligned with the inlet and outlet passages 14 and 15 of the valve housing 12. A latching means including a latch finger 28 is pivotally mounted to the mounting plate 20 upon a pivot 29 and urged into a latching position by a coiled spring 30. A roller engagement 31 is provided on the exterior surface of the drum housing 21, and of course is positioned to be engaged by the latch finger 28 when the valve is fully opened, as shown in FIG. 2.

Mounting plate 20, it will be noted, is provided with three depressions 24, any one of which may be engaged by a boss 25 formed on the valve body 12 to prevent relative rotation between the mounting plate and the valve body. This construction allows the mounting plate to be rotatably oriented relative to the valve and to the related valve connections.

The inner surface of hub sleeve 27, it will be seen, accepts the sleeve portion 22 of drum 21 and a bushing 40 is provided which permits a smooth operation of the drum as it rotates relative to the mounting plate 20. The drum arbor 22 is formed with a hexagonal recess 41 shaped to correspond with the hexagonal cross section of the conventional valve stem 17. Thus, any rotation of the drum 21 in its arbor 22 will correspondingly rotate the valve stem 17 and the valve element 13.

Although the clock spring 26 may be secured to the drum 21 and to the sleeve portion 27 of the mounting plate 20 by any suitable means, the ends of the spring may be hooked into recesses 42 of the drum and 43 of sleeve portion 27.

A pair of lugs 44 and 45 extend from the end of sleeve portion 27 and are received in arcuate grooves 46 and 47, respectively, of the drum housing 21. This structure limits the rotational movement of the drum relative to the mounting plate and such movement is restricted to slightly more than 90°.

Referring to FIG. 2, a rotational movement of the drum 21 to a closed position is arrested by the engagement of lugs 44 and 45 with the ends 46a and 47a of the grooves. Similarly, rotational movement of the drum to an open position is limited by the engagement of the lugs 44 and 45 with the opposite ends 46b and 47b of the grooves.

Drum housing 21 further provides an external sleeve portion 48 formed with a pair of symmetrical notches extending from an outer end and adapted to be engaged by an operating bar extending diametrically of the pivoted valve element axes. Although an operating bar is not shown, it will be evident that such means may be employed for the purpose of turning the drum against the force of the clock spring and thereby opening the valve. However, means is further provided and disposed within the sleeve portion 48 for exerting a bias force tending to dislodge any operating bar that is but loosely engaged with the notches 49. For this purpose a helical spring 50 and a plug 51 are axially disposed within the sleeve portion 48 and a pair of pins 52 are employed for retaining the plug within the sleeve. Plug 51 is, of course, biased into a position tending to dislodge an operating bar which may have been inadvertently left in an engagement with the notches 49 and the notches themselves, it will be seen, are formed in such a manner that an operating rod may be easily dislodged by the force of the plug and spring 50. Accordingly, the construction of the actuating mechanism is such that it will ensure that no operating handle can be left in an engagement with the operating drum when the device is left unattended.

The spring wound drum 21 is latched in an open position by engagement of a roller 31 by a latch finger 28 pivotally mounted upon the mounting plate 20 by a pin 29. Latch finger 28 is biased toward drum 21 by a spring 30. When the latch finger 28 is moved against the spring 30 and away sufficiently from the drum to permit its abrupt shoulder to clear the roller 31, spring 26 will promptly rotate the drum to a closed position. When the valve is again opened by means to be described, roller 31 engages the incline of the latch finger and forces it against the compression of spring 30. When the drum has been rotated far enough for the roller 31 to clear the shoulder of the latch finger, spring 30 will return the latch finger to the position shown in FIG. 2.

Referring to FIG. 3, the latching mechanism including the latch finger 28 may be formed as part of a pressure-responsive assembly which is fastened to the mounting plate 20 by a pair of cap screws 60. This assembly includes a housing 61 formed with a cylindrical bore 62 and having a coaxial guide passage 63 formed in an upper end of reduced size. The upper end of the housing is further provided with a pair of diametrically aligned longitudinal slots 64 and 65.

A piston 66 is slidably mounted in bore 62 and a piston rod 67 attached to the piston is received in the guide passage 63. The upper end of the rod as shown in FIG. 3 is formed with a transverse aperture for receiving a pin 68. The ends of the pin extend through slots 64 and 65 of the upper end of the housing. It will be evident then that the piston and piston rod can move between upper and lower positions as limited by the engagement of pin 68 with the ends of slots 64 and 65.

A lost motion connection is provided intermediate piston 66 and latch lever 28. For this purpose, a link 69 is pivoted at one end to the latch finger by a pin 70 and at the other end to the piston by a pin 71. It will be noted that a slot 72 of the link 69 permits an over-travel of the piston relative to the link should the piston be moved from the position of FIG. 3 toward the latch finger 28. However, an upward movement of the piston from the position shown will impart movement to the latch finger 28 causing it to move against the biasing force of spring 30.

A spring 73 disposed in the cylindrical bore 62 is supported against a seat 74 that is held in place by a retaining ring 75, said ring being received in a suitable annular groove formed in the inner wall of the bore 62. The upper end of spring 73 circumvallates a spring guide provided on the piston 66 and engages the piston, thereby imposing a biasing force that tends to move the piston 66, link 69 and latch finger 28 in an upward direction.

A seal ring 76 is provided in an exterior groove of the piston 66 and serves to seal between the piston and the bore 62. Similarly, a seal 77 is provided between piston rod 67 and the guide passage 63, thereby forming an enclosed pressure chamber 78. Fluid pressures are applied to the pressure chamber 78 through a passage 79 having an enlarged threaded opening 80 adapted for receiving a conventional nipple attachment (not shown) to a pressure control line PCL.

It is to be understood that the pressure in the pressure control line during normal conditions is sufficient to maintain piston 66 against the biasing force of spring 73 and in a position that permits latch finger 28 to engage the roller 31, but if the pressure in chamber 78 should be reduced, spring 73 will move the piston and the latch finger into a latch-releasing position allowing the valve 11 to be closed by the clock spring 26 which rotates the drum 21 and the valve element 13 in a clockwise direction. Obviously, the valve will be closed any time spring 73 is able to overcome the bias of the pressure in chamber 78.

Mechanism 10 is further provided with means for manually resetting piston 66 and operating the latch finger to a latching position although an abnormally low pressure may exist in the chamber 78. For this purpose there is provided a cam ring 81 having a pair of helical cam surfaces 82 as best shown in FIGS. 4 and 5. Cam ring 81 is disposed about the reduced-diameter portion of housing 61 and is retained thereon by a cap head 83, a washer 84, and a snap ring 85. As shown, head 83 is provided with an internal downwardly extending pin 86 which engages a notch 87 formed in the cam ring 81. Both the cap head 83 and the cam ring 81 are provided with internal bushings 88 and 89, respectively, which will reduce the friction resulting from rotation between them and the end of housing 61.

A profile of one cam surface 82 is shown in FIG. 5 and the distance D indicates a linear layout of one-half of the circumference of the helical cam surface. In this drawing it will be noted that the profile of the cam surface 82 extends downwardly from a high point 90 at an angle of about 60° relative to a line parallel to the axis of the ring, leveling off at a point 91 and again rising to form a retention groove 92. The cam surface 82 is confined between the straight sides 93 and 94 which extend substantially parallel with the axis of the ring. Of course, as indicated, cam ring 81 is provided with two profiles such as shown in FIG. 5.

Referring again to FIG. 3, it will be evident that cam ring 81 is rotatable about the reduced portion of housing 61 having a coiled spring 95 disposed about the cam ring with its lower end engaged in a suitable recess 96 of the housing and its upper end engaged in a suitable aperture 97 of a flanged portion of the cam ring. Spring 95 biases the cam ring in a clockwise direction toward a normal position where the pin 68 is engaged by the straight side 93 of the cam surfaces 82. In this position the cam ring does not interfere with the up and down movement of the pin 68 nor, therefore, with the piston 66 and piston rod 67 to which it is attached. Accordingly, in its normal position cam ring 81 permits the spring bias 73 to move the piston 66 and actuate the latch finger 28 when the pressure in chamber 78 is abnormally low. Also, in the event of an abnormally low pressure, and when piston 66 approaches the closed end of cylinder bore 62, pin 68 will be positioned near the uppermost point 90 of the cam surface 82.

When it is desired to reopen the valve after pressure has been restored in chamber 78 an operating handle may be used to rotate the drum in a counterclockwise direction until the latch finger 28 engages the roller 31 as previously explained. However, it is also possible to restore the valve 11 to an open condition before the pressure has been reapplied to chamber 78 by rotating the cam ring 81.

Referring to FIGS. 3 and 5, cap head 83 is rotated clockwise as far as it will turn, thereby rotating cam ring 81 until the surface 94 makes contact with the pin 68. During the rotative movement of cam ring 81, the ends of pin 68 are moved downwardly along the cam surfaces 82, moving the piston 66 against spring 73 and returning the latch finger 28 to a normal latch-engaging position. When the ends of pin 68 pass points 91 of the cam surfaces and are further received in the grooves 92, the bias force of spring 73 will hold the pin within the grooves 92 since the biasing force of spring 95 is insufficient to cam the pin 68 downwardly against the bias of spring 73. Of course, the cam ring 81 may be manually rotated relative to the housing 61 to overcome the retention bias of spring 73. Spring 95 will then turn cam ring 81 counterclockwise until the surfaces 93 come into contact with the ends of pin 68.

It should be noted that although a latching mechanism has been manually reset by the operation of the cam ring 81, it is unnecessary that the cam ring be reversely rotated after the pressure in chamber 78 is reapplied in order to recondition the latching mechanism, for when the pressure in chamber 78 is sufficient to force the piston 66 against the bias of spring 73, pin 68 will be dislodged from the grooves 92 and the cam ring will then be automatically rotated by the spring bias 95. Thus the latching mechanism is automatically reset for triggering a closure of valve 11 following the application of a normal operating pressure in the chamber 78.

The embodiment of FIGS. 1–3 is provided with a seal ring 98 having a bias spring 99 to close the peripheral gap between the head cap 83 and the housing 61. A seal device of this kind will effectively prevent dust and other debris from entering the triggering mechanism especially in the region of the cam ring.

It is to be understood that the form of the invention herewith shown and described is to be taken as a preferred example thereof, and that various changes may be made in the shape, size and arrangement of certain parts without departing from the spirit of the invention or the scope of the attached claims, and each of such changes is contemplated.

Having thus described my invention, what I claim and desire to secure by Letters Patent is:

1. In combination, a valve having a rotatably operated valve element, means for rotatably biasing said valve element, means for latching said valve element in opposition to said rotatable biasing means, means responsive to an abnormal pressure for releasing said latching means and allowing said valve element to be operated by said biasing means, means for manually resetting said pressure responsive means and operating said latching means to a latching position while an abnormal pressure is existent, and mechanical means for maintaining said manual resetting means in a reset position only so long as said abnormal pressure exists.

2. In combination with a device having a pivoted member, a condition responsive actuating mechanism comprising means including a support for mounting said mechanism to said device, a spring operated drum housing secured to said pivoted member and journaled in said support, a clock spring coiled within said drum and having ends connected between said mounting means and said drum housing, means mounted on said support and on the periphery of said drum for latching said drum housing against the bias of said clock spring, and means responsive to an abnormal fluid pressure for releasing said latching means.

3. The condition-responsive actuating mechanism of claim 2 wherein said spring drum housing is substantially circular and includes a coaxial sleeve portion formed with a pair of notches extending from an outer end and adapted to be engaged by an operating bar, and further comprising means disposed within said sleeve portion for exerting a bias force tending to dislodge any operating bar that is engaged with said notches.

4. The condition-responsive actuating mechanism of claim 3 wherein said means for exerting a bias force comprises a helical spring and a plug, and further comprising means for retaining said plug within said sleeve.

5. The condition-responsive actuating mechanism of claim 2 wherein said latching means comprises a latching finger pivotally mounted to said support, and a spring bias urging said finger toward a latching position.

6. The condition-responsive actuating mechanism of claim 2 wherein said means responsive to an abnormal fluid pressure comprises a cylinder having one closed end and one end open to atmosphere, piston means disposed in said cylinder and responsive to fluid pressure within the enclosed end of said cylinder, means resiliently biasing said piston toward said closed end, and a lost motion linkage connection intermediate said piston and said latching means, said linkage connection allowing relative movement between said piston and latching means for all normal pressures within the enclosed end of said cylinder but moving said latching means when pressures are abnormal.

7. The condition-responsive actuating mechanism of claim 6 and further comprising means for manually moving said piston against said biasing means, and retaining said piston in a position permitting operation of said latching means.

8. The condition-responsive actuating mechanism of claim 7 wherein said piston moving means comprises a piston rod mounted to said piston, a rotatable helical cam disposed for being rotated coaxially relative to said piston rod, and a cam follower secured to said piston rod and engageable with said helical cam.

9. The condition-responsive actuating mechanism of claim 8 and further wherein said helical cam is formed with a retention groove for receiving said cam follower, said groove being formed at that point of the cam axially nearest to said cam follower when said piston occupies positions permitting operation of said latching means.

10. The condition-responsive actuating mechanism of claim 9 wherein said piston moving means further comprises a biasing means for rotatably urging said helical cam into a position placing the point of the cam axially farthest from said cam follower in alignment therewith, thereby allowing said cam follower to be moved with said piston and releasing said latching means.

11. A pressure-responsive actuating mechanism for use with a valve device having a pivotally operated valve element disposed in a valve housing, comprising: a mounting plate adapted for being secured to the housing of a valve device and having a cylindrical hub sleeve portion projecting coaxially of the valve element pivot axis, a spring operated drum housing having an internally housed arbor journaled in said hub sleeve portion and adapted for being coaxially secured to the valve element upon its pivot axis, a clock spring coiled within said drum and having one end connected to said hub sleeve portion and the other end secured to said spring operated drum housing, a latching lever pivotally mounted to said mounting plate, a latch engagement mounted exteriorly upon said drum housing and adapted to be retained by said latching lever in a position of drum housing rotation placing said clock spring under tension, means for pivotally biasing said latching lever toward a latching position, and means responsive to fluid pressure and mounted to said mounting plate for moving said latching lever against said biasing means.

12. The pressure-responsive actuating means of claim 11 wherein said spring drum housing includes an external sleeve portion formed with a pair of notches extending from an outer end and adapted to be engaged by an operating bar, and further comprising means disposed within said sleeve portion for exerting a bias force tending to dislodge any operating bar that is engaged with said notches.

13. The pressure-responsive actuating means of claim 11 and further wherein said mechanism is connected to a valve device having a pivotally operated valve element to which said spring operated drum housing is secured.

References Cited in the file of this patent

UNITED STATES PATENTS

| 1,617,156 | Hardway | Feb. 8, 1927 |
| 1,703,813 | Carson | Feb. 26, 1929 |
| 2,673,707 | McRae | Mar. 30, 1954 |
| 2,797,699 | Hug | July 2, 1957 |
| 2,963,115 | Peras | Dec. 6, 1960 |
| 3,043,403 | Kelley | July 10, 1962 |

FOREIGN PATENTS

| 738,582 | Great Britain | Oct. 19, 1955 |